United States Patent [19]
Machi et al.

[11] 4,137,137
[45] Jan. 30, 1979

[54] RADIATION PROCESS FOR THE PRODUCTION OF GRAFT COPOLYMER TO BE USED FOR ION-EXCHANGE MEMBRANE

[75] Inventors: Sueo Machi, Takasaki; Takanobu Sugo, Gunma; Akio Sugishita; Sakunobu Kanai, both of Takasaki; Hiroshi Fujiwara, Ohmiya, all of Japan

[73] Assignees: Japan Atomic Energy Research Institute, Tokyo; Maruzen Oil Company Limited, Osaka, both of Japan

[21] Appl. No.: 815,423

[22] Filed: Jul. 13, 1977

[30] Foreign Application Priority Data

Jul. 14, 1976 [JP] Japan .................................. 51-83765

[51] Int. Cl.$^2$ ............................................... C08F 8/00
[52] U.S. Cl. .......................... 204/159.16; 204/159.17; 260/878 R; 260/884; 260/885; 260/886; 521/27; 521/31; 260/879
[58] Field of Search ...................... 204/159.15, 159.17; 260/2.1 R, 2.1 E

[56] References Cited

U.S. PATENT DOCUMENTS

| | | | |
|---|---|---|---|
| 3,634,218 | 1/1972 | Gotohda et al. | 204/159.17 |
| 3,700,609 | 10/1972 | Tregear et al. | 204/159.17 X |
| 3,708,555 | 1/1973 | Gaylord | 204/159.17 X |
| 3,926,864 | 12/1975 | Hodgdon, Jr. | 260/2.1 E |
| 3,945,927 | 3/1976 | Imai et al. | 210/500 M |
| 3,947,351 | 3/1976 | Asawa et al. | 260/2.1 E X |
| 3,970,534 | 7/1976 | Fujiwara et al. | 204/159.17 |
| 3,991,017 | 11/1976 | Barrett et al. | 260/2.1 E X |

*Primary Examiner*—Richard B. Turer
*Attorney, Agent, or Firm*—Browdy & Neimark

[57] ABSTRACT

A graft copolymer membrane prepared by co-grafting a mixture of monomers consisting essentially of acyloxystyrene and/or hydroxystyrene, a polyene compound and at least one member selected from the group consisting of acrylic acid, methacrylic acid and esters of these acids onto a hydrocarbon type of fluorine-containing type polymer by means of ionizing radiation exhibits improved mechanical strength and reduced electrical resistance and provides an excellent ion-exchange membrane.

4 Claims, No Drawings

RADIATION PROCESS FOR THE PRODUCTION OF GRAFT COPOLYMER TO BE USED FOR ION-EXCHANGE MEMBRANE

This invention relates to a process for the production of a novel and useful high polymer membrane having functional groups.

The production of graft copolymers by grafting side chains consisting essentially of acyloxystyrene and/or hydroxystyrene and a polyene compound onto a main polymer chain of a hydrocarbon polymer or a fluorine-containing polymer has already been proposed. Acyloxystyrene and/or hydroxystyrene or a mixture of one or both of them with a polyene compound can be co-grafted onto a hydrocarbon polymer or a fluorine-containing polymer with the aid of ionizing radiation of means of a so-called "pre-irradiation" or "simultaneous irradiation" method.

The graft copolymers thus obtained are useful high polymers having various uses. One representative example of such uses is an ion-exchange membrane making use of phenolic hydroxy groups grafted on the polymer in the form of a membrane. Graft copolymers having acyloxy radicals are of course equally useful for the same purpose, because acyloxy groups can be changed in any proportion according to demand to phenolic hydroxyl groups by the hydrolysis of the copolymers.

When these copolymers are contemplated to be used as an ion-exchange membrane, their mechanical strength is as important as their electrical characteristic properties such as electrical resistance. To increase the mechanical strength of a membrane is attainable, for example by adding to the reaction system a polyene compound such as divinyl-benzene in the course of graft reaction to partially bring about a cross-linked net-work structure in the polymer chain. However, the resulting product has a defect in that it has a substantially greater electrical resistance as compared with the case wherein no polyene compound is used.

As a result of their research, the present inventors have found that by the addition as a third component of a monomer such as acrylic acid, methacrylic acid or an ester of each acid to the mixture of monomers, the electrical resistance decreases significantly. Based on such discovery, the present invention has been accomplished.

Hydrocarbon type polymers which can be used as a raw material in the practice of the present invention include aliphatic type polymers such as polyethylene, polypropylene, polybutene, etc.; aromatic type polymers such as polystyrene, poly(α-methylstyrene), etc.; alicyclic type polymers such as polyvinylcyclohexane, etc. and the copolymers of the above mentioned types. Fluorine-containing polymers which can be used as a raw material in the practice of the present invention include polyethylene tetrafluoride, polyvinylidene fluoride, ethylene-ethylene tetrafluoride copolymer, ethylene tetrafluoride-propyrene hexafluoride copolymer, vinylidene fluoride-propyrene hexafluoride copolymer, etc.

Acyloxystyrenes which can be used for a graft component in the practice of the present invention can be represented by the general formula:

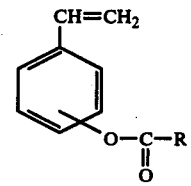

wherein the substituents can be in the position of ortho, metha and para to each other, and R represents a linear or branched aliphatic hydrocarbon group having 1–20 carbon atoms in the molecule, an alicyclic or an aromatic hydrocarbon radical such as, for example, acetoxystyrene, propionyloxystyrene, butyryloxystyrene, benzoyloxystyrene, etc. Para-acetoxystyrene is used most occasionally.

Hydroxystyrenes which can be used for a graft component in the practice of the present invention may be any of the ortho, metha- and para-isomers thereof or a mixture of any two or more of them. Para-hydroxystyrene is used most occasionally.

Polyene compounds which can be used as a graft component in the practice of the present invention include a compound having in its molecule at least two double bonds which can be polymerized such as, for example, divinylbenzene, isoprene, butadiene, cyclopentadiene, ethylidenenorbornen, etc., as well as diol esters of acrylic and methacrylic acids, divinyl ester of adipic acid, etc. Among those, divinylbenzene and isoprene are most preferably used. Any of the ortho-, metha- and para-isomers of divinylbenzene can be used, but generally, a mixture of these three is used. Commercially available divinylbenzene is generally a mixture containing about 45% by weight of ethylvinylbenzene in addition to divinylbenzene. This mixture can be used for reaction as it is. The mixing ratio of acyloxystyrene and/or hydroxystyrene; a polyene compound; and acrylic or methacrylic acid or an ester of said acid can be determined arbitrarily, but generally the weight ratio of acyloxystyrene and/or hydroxystyrene and acrylic or methacrylic acid or an ester of said acid to a polyene compound is chosen within the range of 200/1–1/1, most preferably 50/1–2/1. The weight ratio of acyloxystyrene and/or hydroxystyrene to acrylic or methacrylic acid or an ester of said acid can be in the region of 200/1–1/1, preferably 50/1–2/1.

These acyloxystyrene and/or hydroxystyrene, a polyene compound and acrylic or methacrylic acid or an ester of said acid can be dissolved in an organic solvent to provide a solution which is used for the graft polymerizing reaction. Useful organic solvents for said purpose include those types of organic solvents which can homogeneously dissolve acyloxystyrene and/or hydroxystyrene, a polyene compound and acrylic or methacrylic acid or an ester of such acid but can not dissolve hydrocarbon type polymers or fluorine-containing type polymers. Representative examples of such organic solvents include, for example, ketones such as acetone, methylethylketone, etc.; esters such as ethyl acetate, butyl acetate, etc.; alcohols such as methyl alcohol, ethyl alcohol, propyl alcohol, butyl alcohol, etc.; ethers such as tetrahydrofuran, dioxane, etc.; aromatic hydrocarbons such as N,N-dimethylformamide, N,N-dimethylacetoamide, benzene, toluene, etc.; aliphatic or alicyclic hydrocarbons such as n-heptane, cyclohexane, etc. or the mixtures of those as mentioned above. Among the compounds mentioned above, those which can swell hydrocarbon type polymers or fluorine-containing polymers can be used most conveniently. The graft polymerization in the practice of the present invention, is carried out with the aid of ionizing radiation. Graft polymerization by means of ionizing radiation can be carried out by two different types of methods: one is the "pre-irradiation method" wherein a polymer to constitute a main chain is irradiated with ionizing radiation in the absence of a graft monomer and then the irradiated polymer is put in contact with a graft monomer; the other is the "simultaneous irradiation method" wherein a polymer to become a main chain is irradiated in the presence of a graft monomer. In the practice of the present invention, both of the above mentioned irradiation methods are employable. Ionizing radiations employable in the practice of the present invention include gamma-rays, X-rays, electron beam, alpha-rays and mixtures of these.

The total dose required to complete the graft polymerization is generally $10^5$ rads or greater.

Though there is no particular limitation with respect to the temperature at which irradiation is carried out according to the "pre-irradiation method", room or lower temperature is generally preferred because the higher temperature may undesirably cause the extinction of radicals.

The graft copolymers (membrane) prepared according to the process of the present invention may be washed, as occasion demands, with an organic solvent selected from alcohols such as methanol, ethanol, propyl alcohol, etc.; ketones such as acetone, methyl ethyl ketone, etc.; aromatic hydrocarbons such as benzene, toluene, etc.; or mixtures of those.

Graft copolymers having side chains containing acyloxystyrene are subjected to hydrolysis treatment to convert the acyloxy group in the side chain to a hydroxyl group before it is used for an ion-exchange membrane.

This hydrolysis is as easy as in the case of the hydrolysis of a phenol ester, which is often carried out according to a conventional method. It is much easier than the hydrolysis of the ester of a primary alcohol, and can easily be carried out under modest conditions. In particular, the reaction can be carried out by dissolving an acid or a base each used as a catalyst, in water or a mixed solvent of water and a water-soluble organic solvent and placing the graft copolymer (membrane) in the resulting solution to pursue the hydrolysis of acyloxy groups contained in the side chains of the polymer.

Since the hydrolysis is usually carried out in a heterogeneous system, it is preferred to pursue the reaction in a mixture of water and a water-soluble organic solvent such as an alcohol or a ketone so as to improve the affinity between the reactants and the catalyst or, particularly in the case of using an acidic catalyst, so as to dissolve the organic acid produced in the solution as a result of the elimination reaction. Proper reaction temperatures for hydrolysis are between 50° C. and 100° C.

The following examples will further illustrate the present invention.

EXAMPLE 1

Into one of the legs of an H-type glass ampoule was placed 70 ml of a solution of monomers comprising 36% by weight of p-acetoxystyrene, 9% by weight of acrylic acid, 5% by weight of divinylbenzene (55% purity product containing 45% of ethylstyrene), and 50% by weight of toluene, and the solution was subjected to degassification treatment in a vacuum by means of a freezing and thawing method. Into the other leg of the same ampoule was placed a strip of medium-density polyethylene film (150μ thick and 2.60 g in weight) which had been irradiated with electron beams for 20 Mrads (at an accelerating voltage of 2.0 MeV and an accelerating electrical current of 1 mA) in a stream of nitrogen at room temperature, and then the ampoule was fully evacuated. When a high vacuum was obtained, the solution of monomers was moved from the original place to the other leg of the ampoule which contained the strip of film to react it with monomers at 60° C. for 4 hours. When the reaction was finished, the film was washed well with acetone and dried at reduced pressure until the weight reached a constant value. The degree of grafting determined from the relative weights before and after the reaction was 99.5%. The weight of this product did not change even after repeated acetone extractions.

The film thus obtained was placed in a 100 ml-flask with a cooling tube attached and 50 ml of a solution of concentrated hydrochloric acid and methanol in the ratio of 1:4 (volume) was added thereto followed by heating in a warm water-bath for 30 minutes.

The membrane thus obtained having both phenolic hydroxyl groups and carboxyl groups was effective as an ion-exchange membrane and the electrical resistance thereof was as low as 6.2 $\Omega$-cm$^2$, which was a substantial reduction as compared with the membrane obtained by the same reaction as mentioned above except that no acrylic acid was used. The electrical resistance of the membrane in the latter case was 10–15 $\Omega$-cm$^2$ as determined in a 0.5 N-aqueous NaOH solution according to a conventional method.

EXAMPLE 2

Into one of the legs of an H-type glass ampoule was placed 70 ml of a solution of monomers consisting essentially of 22.5% by weight of p-acetoxystyrene, 22.5% by weight of acrylic acid, 5% by weight of divinylbenzene (55% purity product containing 45% of ethylstyrene), and 50% by weight of toluene and the graft polymerization reaction was carried out at 60° C. for 6 hours in the similar manner as in Example 1. The degree of grafting determined from the weight difference before and after the reaction was 89.5%. The film thus obtained was subjected to hydrolysis in the similar manner as described in Example 1. The electrical resistance of this graft copolymer was 5.7 $\Omega$-cm$^2$.

EXAMPLE 3

Into one of the legs of an H-type glass ampoule was placed 70 ml of a solution of monomers comprising 36% by weight of p-acetoxystyrene, 9% by weight of methacrylic acid, 5% by weight of divinylbenzene (55% purity product containing 45% of ethylstyrene), and 50% by weight of toluene and the graft polymerization was carried out in the similar manner as in Example 1 at 60° C. for 6 hours. The degree of grafting determined from the weight difference before and after the reaction was 100%.

The film thus obtained was subjected to hydrolysis in the similar manner as in Example 1. The electrical resistance of this graft polymer membrane was 8.4 $\Omega$-cm$^2$.

EXAMPLE 4

Into one of the legs of an H-type glass ampoule was placed 70 ml of a solution of monomers comprising 36% by weight of p-acetoxystyrene, 9% by weight of acrylic acid, 5% by weight of divinylbenzene (55% purity product containing 45% of ethylstyrene) and 50% by weight of tetrahydrofuran, followed by fully degassing in a vacuum by means of a freezing and thawing method. Into the other leg of the same H-type ampoule was placed a strip of ethylene-ethylene tetrafluoride copolymer film (150μ thick and 4.15 g in weight) which had been cooled to −20° C. and irradiated in a stream of nitrogen with electron beams to a dose of 3 Mrads (at accelerating voltage of 2.0 MeV and accelerating electrical current of 1.0 mA) before evacuating the ampoule fully. When a high vacuum was obtained, the solution of monomers was moved from the original place to the other leg in which the strip of film was contained and the reaction was allowed to proceed at 60° C. for 8 hours. The degree of grafting determined from the relative weights before and after the reaction was 30.5%.

The film thus obtained was then subjected to hydrolysis in a manner similar to that in Example 1. The resulting membrane having both phenolic hydroxyl groups and carboxyl groups was useful as an ion-exchange membrane and exhibited an extremely low electrical resistance such as 5.8 $\Omega$-cm$^2$, while the electrical resistance of a membrane having the grafting degree of 30–35% prepared in the same manner as mentioned above but without the addition of acrylic acid was 10–15 $\Omega$-cm$^2$.

EXAMPLE 5

The graft polymerization was carried out in the same manner as in Example 4 except that methacrylic acid was substituted for acrylic acid. The degree of grafting determined from the weight difference before and after the reaction was 27.6%.

The film thus obtained was subjected to hydrolysis in a manner similar to that in Example 1. The resulting graft copolymer membrane showed an electrical resistance of 7.3 $\Omega$-cm$^2$.

What we claim is:

1. A process for the production of a graft copolymer to be used for an ion-exchange membrane which comprises:
   co-grafting a mixture of monomers selected from the group consisting of acyloxystyrene, hydroxystyrene, and mixtures thereof,
   a polyene compound selected from the group consisting of divinylbenzene, isoprene, butadiene, cyclopentadiene, ethylidenenorbornene, diol ester of acrylic acid, diol ester of methacrylic acid, and divinyl ester of adipic acid, and
   acrylic or methacrylic acid,
   onto a hydrocarbon type polymer selected from the group consisting of polyethylene, polypropylene, polybutene, polystyrene, poly($\alpha$-methylstyrene), polyvinylcyclohexane and copolymers which consist essentially of the major components of said above mentioned hydrocarbon type polymers, or
   a fluorine-containing type polymer selected from the group consisting of polyethylene tetrafluoride, polyvinylidene fluoride, ethylene-ethylene tetrafluoride copolymer, ethylene tetrafluoride-propylene hexafluoride copolymer, and vinylidene fluoride-propylene hexafluoride copolymer,
   by means of ionizing radiation.

2. The process as defined in claim 1 in which said acyloxystyrene as a graft monomer is a compound having the following general formula:

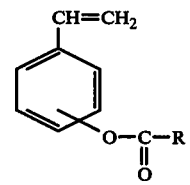

wherein the substituents can be in the position of ortho, metha and para to each other and R represents a linear or branched aliphatic hydrocarbon group having 1–20 carbon atoms in the molecule, an alicyclic or an aromatic hydrocarbon radical.

3. The process as defined in claim 1 in which said hydroxystyrene as a graft monomer is ortho-, metha-, or para-hydroxystyrene or a mixture of these.

4. The process of claim 1 wherein said acyloxystyrene is selected from the group consisting of acetoxystyrene, propionyloxystyrene, butyryloxystyrene, and benzoyloxystyrene.